United States Patent
Dankbaar et al.

(10) Patent No.: US 10,107,410 B2
(45) Date of Patent: Oct. 23, 2018

(54) FLUID ROUTING DEVICE HAVING A SHAPE MEMORY ALLOY MEMBER

(71) Applicant: Kongsberg Automotive AB, Mullsjö (SE)

(72) Inventors: Frank Dankbaar, Mullsjö (SE); Anders Grönhage, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 131 days.

(21) Appl. No.: 14/773,126

(22) PCT Filed: Mar. 6, 2013

(86) PCT No.: PCT/IB2013/000307
§ 371 (c)(1),
(2) Date: Sep. 4, 2015

(87) PCT Pub. No.: WO2014/135909
PCT Pub. Date: Sep. 12, 2014

(65) Prior Publication Data
US 2016/0018016 A1    Jan. 21, 2016

(51) Int. Cl.
*F16K 31/02* (2006.01)
*F16K 7/12* (2006.01)
*B60N 2/90* (2018.01)

(52) U.S. Cl.
CPC ............ *F16K 31/025* (2013.01); *B60N 2/914* (2018.02); *F16K 7/12* (2013.01)

(58) Field of Classification Search
CPC ........ F16K 31/025; F16K 7/12; F16K 31/002; F16K 31/465; F16K 31/5288; F16K 31/523; F16K 31/02; B60N 2/4415; B60N 2/914
(Continued)

(56) References Cited

U.S. PATENT DOCUMENTS 2,299,404 A    10/1942  Newton
3,480,040 A  * 11/1969  Erickson ................. F16K 11/24
                                                          137/883
(Continued)

FOREIGN PATENT DOCUMENTS

CN        101725733 A     6/2010
DE        102 57 549 B3   8/2004
(Continued)

OTHER PUBLICATIONS

English language abstract and computer-generated translation for JPH0771628 extracted from espacenet.com database dated Jan. 12, 2017, 7 pages.
(Continued)

*Primary Examiner* — Craig J Price
*Assistant Examiner* — Andrew J Rost
(74) *Attorney, Agent, or Firm* — Howard & Howard Attorneys PLLC (57) ABSTRACT

The subject invention provides a fluid routing device for directing the transportation of a fluid including a housing defining first and second corridors selectively fluidly coupled to one another, and a valve assembly capable of alternating between an open configuration fluidly coupling the first and second corridors and a closed configuration fluidly separating the first and second corridors. A shape memory alloy member alternates between a de-energized state and an energized state. A link is pivotably mounted to the housing and is coupled between the valve assembly and the shape memory alloy member. The link pivots between a first position when the shape memory alloy member is in the de-energized state and a second position when the shape memory alloy member is in the energized state which alternates the valve assembly between the closed configu- (Continued)

ration and the open configuration for selectively fluidly coupling the first and second corridors.

17 Claims, 10 Drawing Sheets

(58) Field of Classification Search
USPC .................. 251/11, 331, 294, 244, 242, 236; 137/625.42
See application file for complete search history.

(56) References Cited

U.S. PATENT DOCUMENTS

| | | | |
|---|---|---|---|
| 4,429,552 | A | 2/1984 | Reedy |
| 4,570,851 | A | 2/1986 | Cirillo |
| 4,655,505 | A | 4/1987 | Kashiwamura et al. |
| 4,840,425 | A | 6/1989 | Noble |
| 4,973,024 | A | 11/1990 | Homma |
| 5,127,708 | A | 7/1992 | Kishi et al. |
| 5,135,282 | A | 8/1992 | Pappers |
| 5,345,963 | A | 9/1994 | Dietiker |
| 5,622,482 | A | 4/1997 | Lee |
| 5,669,416 | A | 9/1997 | Nusche |
| 5,787,947 | A | 8/1998 | Hertsgaard |
| 6,024,545 | A | 2/2000 | Morioka |
| 6,116,569 | A | 9/2000 | Cox |
| 6,123,320 | A * | 9/2000 | Rasanow .............. F16K 31/122 251/331 |
| 6,220,667 | B1 | 4/2001 | Wagener |
| 6,247,678 | B1 | 6/2001 | Hines et al. |
| 6,276,385 | B1 | 8/2001 | Gassman |
| 6,449,434 | B1 | 9/2002 | Fuss |
| 6,464,200 | B1 | 10/2002 | Hines et al. |
| 6,494,225 | B1 | 12/2002 | Olewicz et al. |
| 6,564,824 | B2 | 5/2003 | Lowery et al. |
| 6,918,884 | B2 | 7/2005 | Knelsen et al. |
| 6,972,659 | B2 | 12/2005 | von Behrens et al. |
| 7,093,817 | B2 | 8/2006 | MacGregor et al. |
| 7,331,563 | B2 | 2/2008 | Biehl et al. |
| 7,363,942 | B2 | 4/2008 | Fernandez |
| 7,484,528 | B2 | 2/2009 | Beyerlein et al. |
| 7,663,811 | B2 | 2/2010 | Noda et al. |
| 7,748,405 | B2 | 7/2010 | Ghorbal et al. |
| 7,911,332 | B2 | 3/2011 | Caretta et al. |
| 8,127,543 | B2 | 3/2012 | Von Behrens et al. |
| 8,382,460 | B2 | 2/2013 | Ramunas et al. |
| 8,570,384 | B2 | 10/2013 | Brown |
| 8,714,199 | B2 | 5/2014 | Deperraz et al. |
| 9,027,903 | B2 | 5/2015 | Arekar et al. |
| 9,462,928 | B2 | 10/2016 | Marone et al. |
| 9,630,560 | B2 | 4/2017 | Alacqua et al. |
| 2001/0011414 | A1 | 8/2001 | Antonio et al. |
| 2005/0121636 | A1 | 6/2005 | Scott |
| 2007/0023089 | A1 | 2/2007 | Beyerlein et al. |
| 2007/0166170 | A1 | 7/2007 | Nason et al. |
| 2007/0246285 | A1 | 10/2007 | Browne et al. |
| 2008/0018198 | A1 | 1/2008 | Sohn et al. |
| 2008/0251746 | A1 | 10/2008 | Riley et al. |
| 2008/0254346 | A1 | 10/2008 | Burstall et al. |
| 2008/0271559 | A1 | 11/2008 | Garscha et al. |
| 2010/0111733 | A1 | 5/2010 | Ramunas et al. |
| 2010/0222733 | A1 | 9/2010 | Scheiber et al. |
| 2010/0332035 | A1 | 12/2010 | Gao et al. |
| 2011/0039967 | A1 | 2/2011 | Wilson et al. |
| 2011/0166524 | A1 | 7/2011 | Preuthun et al. |
| 2012/0011843 | A1 | 1/2012 | Makinson et al. |
| 2012/0025113 | A1 | 2/2012 | Stadelbauer et al. |
| 2012/0067430 | A1 | 3/2012 | Deperraz et al. |
| 2012/0153043 | A1 | 6/2012 | Arekar et al. |
| 2012/0160334 | A1 | 6/2012 | Deperraz et al. |
| 2012/0199768 | A1 | 8/2012 | Love et al. |
| 2012/0223554 | A1 | 9/2012 | Lem et al. |
| 2013/0002933 | A1 | 1/2013 | Topliss et al. |
| 2013/0162896 | A1 | 6/2013 | Kang et al. |
| 2013/0277580 | A1 | 10/2013 | Deperraz |
| 2014/0060858 | A1 | 3/2014 | Johnson |
| 2014/0125042 | A1 | 5/2014 | Köpfer et al. |
| 2015/0202993 | A1 | 7/2015 | Mankame et al. |
| 2016/0018016 | A1 | 10/2016 | Dankbaar et al. |

FOREIGN PATENT DOCUMENTS

| | | |
|---|---|---|
| DE | 102005060217 A1 | 7/2006 |
| DE | 10 2008 021 444 A1 | 11/2009 |
| EP | 2 078 891 A2 | 7/2009 |
| EP | 2 239 486 A1 | 10/2010 |
| EP | 2 312 187 A1 | 4/2011 |
| JP | S62167981 A | 7/1987 |
| JP | H0771628 A1 | 3/1995 |
| JP | 2006037786 A | 2/2006 |
| WO | WO 0133306 A2 | 5/2001 |
| WO | WO 2007030417 A2 | 3/2007 |
| WO | WO 2015086088 A1 | 6/2015 |
| WO | WO 2015086089 A1 | 6/2015 |
| WO | WO 2015086094 A1 | 6/2015 |
| WO | WO 2015185132 A1 | 12/2015 |

OTHER PUBLICATIONS

English language abstract and computer-generated translation for DE102005060217 extracted from espacenet.com database dated Feb. 7, 2017, 7 pages.

English language abstract for JPS62167981 extracted from espacenet.com database dated Feb. 7, 2017, 1 page.

English language abstract and computer-generated translation for JP2006037786 extracted from espacenet.com database, 8 pages.

International Search Report for Application No. PCT/IB2013/000307 dated Nov. 11, 2013, 4 pages.

English language abstract and computer-generated translation for DE 102 57 549 extracted from espacenet.com database dated Dec. 21, 2015, 15 pages.

English language abstract and computer-generated translation for DE 10 2008 021 444 extracted from espacenet.com database dated Dec. 21, 2015, 10 pages.

English language abstract and computer-generated translation for EP 2 312 187 extracted from espacenet.com database dated Dec. 21, 2015, 11 pages.

English language abstract and machine-assisted English language translation of Chinese Publication No. CN 101725733 A extracted from www.espacenet.com dated May 11, 2017; 9 pages.

English language translation of JP S62 167981 U provided on Oct. 26, 2017, and certified by Morningside IP on Dec. 11, 2017, which was previously cited in a first Information Disclosure Statement dated Nov. 4, 2016; 8 pages.

* cited by examiner

FLUID ROUTING DEVICE HAVING A SHAPE MEMORY ALLOY MEMBER

RELATED APPLICATIONS

This application is the National Stage of International Patent Application No. PCT/IB2013/000307, filed Mar. 6, 2013, the entire contents of which are hereby incorporated by reference.

BACKGROUND OF THE INVENTION

1. Field of the Invention

A fluid routing device for directing the transportation of a fluid. In particular, the subject invention relates to a unique design of a link coupled to a valve assembly and a shape memory alloy member for alternating the valve assembly between an open configuration and a closed configuration.

2. Description of Related Art

There is a desire within industries implementing fluid transportation to provide for a fluid routing device which can alter the flow path of a fluid. A popular method of altering the flow path of a fluid is through a valve. The valve is fluidly coupled to a first port and a second port and is configured to selectively fluidly couple the first and second ports. Many techniques have been used to alternate the valve for selectively fluidly coupling the first and second ports. One solution in the industry involves a shape memory alloy wire for selectively fluidly coupling the first and second ports. Specifically, the valve has a frame and a valve plunger. The valve plunger is capable of linearly actuating between an open position, for fluidly coupling the first and second ports, and a closed position, for fluidly separating the first and second ports. A bias member biases the valve plunger to the closed position. A slide is coupled to the valve plunger and linearly actuates with the valve plunger along a common plane between the open and closed positions. The shape memory alloy wire is coupled to each of the frame and the slide such that the shape memory alloy wire is substantially disposed along the common plane. The shape memory alloy wire contracts and expands which linearly actuates the frame and the valve plunger along the common plane towards and away from the frame which in-turn alternates the valve plunger between the open and closed positions. Although effective, the linear actuation of the valve plunger by the shape memory alloy wire along the common plane requires contraction and expansion of the shape memory alloy member sufficient to alternate the valve plunger between the open and closed positions. As such, a greater amount of shape memory alloy wire is required order to achieve the desired contraction and expansion.

Therefore, there remains an opportunity to develop a fluid routing device having a valve assembly and a shape memory alloy member with the fluid routing device configured to reduce the amount of shape memory alloy member required to alternate the valve assembly.

SUMMARY OF THE INVENTION AND ADVANTAGES

The subject invention provides for a fluid routing device for directing the transportation of a fluid. The fluid routing device includes a housing defining an interior and further defining a first corridor and a second corridor selectively fluidly coupled to one another. A valve assembly is disposed in the interior and is capable of alternating between an open configuration and a closed configuration. The valve assembly fluidly couples the first and second corridors to one another when in the open configuration and the valve assembly fluidly separates the first and second corridors from one another when in the closed position.

A shape memory alloy member is mounted to the housing within the interior and extends toward the valve assembly. The shape memory alloy member alternates between a first length in a de-energized state and a second length in an energized state.

A link is disposed within the interior and is pivotably mounted to the housing. The link is coupled between the valve assembly and the shape memory alloy member. The link pivots relative to the housing between a first position when the shape memory alloy member is in the de-energized state and the first length and a second position when the shape memory alloy member is in the energized state and the second length. The link is configured to alternate the valve assembly between the closed configuration when the link is in the first position and the open configuration when the link is in the second position for selectively fluidly coupling the first and second corridors to one another.

Accordingly, the subject invention provides for a fluid routing device having a valve assembly, a link, and shape memory alloy member with the link coupled to each of the valve assembly and the shape memory alloy member. The shape memory alloy member pivots the link to alternate the valve assembly between an open configuration and a closed configuration. The pivoting of the link reduces an amount of the shape memory alloy member required to alternate the valve assembly between the open and closed configurations.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
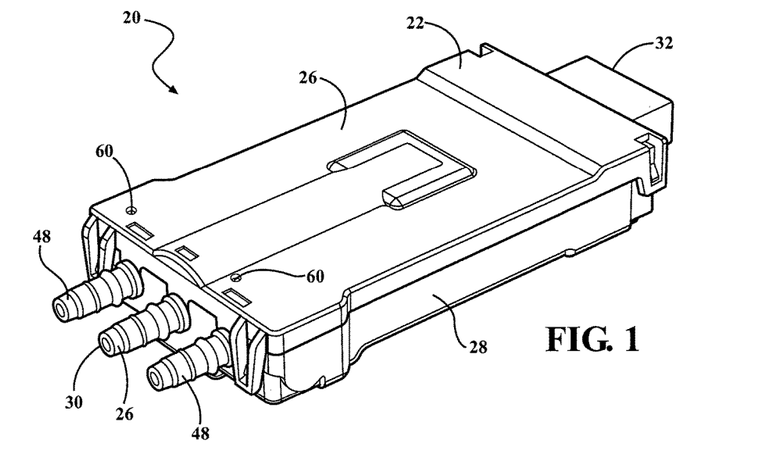
FIG. 1 is a perspective view of a fluid routing device relative to a first section of a housing.
Figure 2:
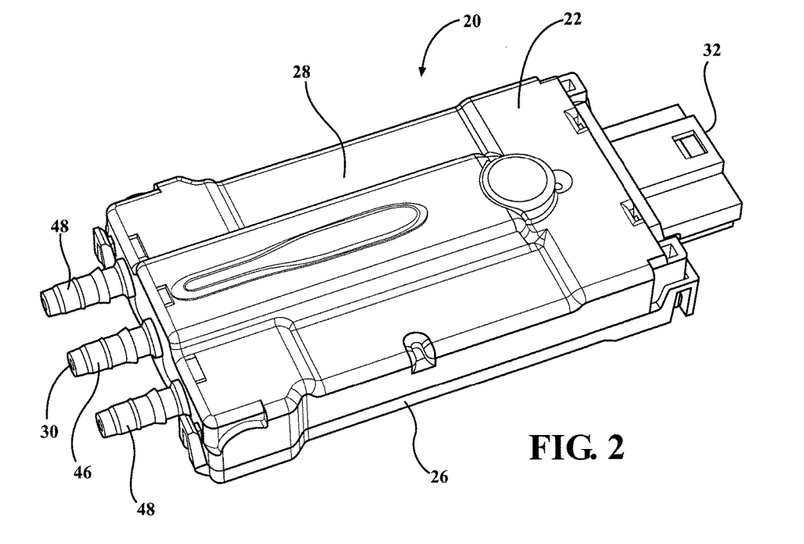
FIG. 2 is a perspective view of the fluid routing device relative to a second section of the housing.

Referring to the Figures, wherein like numerals indicate like or corresponding parts throughout the several views, a fluid routing device 20 for directing the transportation of a fluid is generally shown in FIGS. 1 and 2. The fluid routing device 20 is typically disposed within a vehicle for transporting at least one occupant. The vehicle is further defined as a passenger car, a truck, or any other configuration for providing transportation. The vehicle includes at least one seat disposed within the vehicle for supporting the occupant(s) with the seat having a cell capable of inflating and deflating. The fluid routing device 20 typically directs the transportation of the fluid into and out of the cell for inflating and deflating the cell. Inflation and deflation of the cell varies the support given through the seat to the occupant. The fluid is typically a gas. However, it is to be appreciated that the fluid can be a liquid or any other configuration transportable to and from the cell.

It is to be appreciated that application of the fluid routing device 20 is not limited to within the vehicle. Furthermore, the cell is not limited to application within the seat. As such, the fluid routing device 20 can be disposed in any configuration for transporting the fluid to any configuration of the cell.

Figure 3:
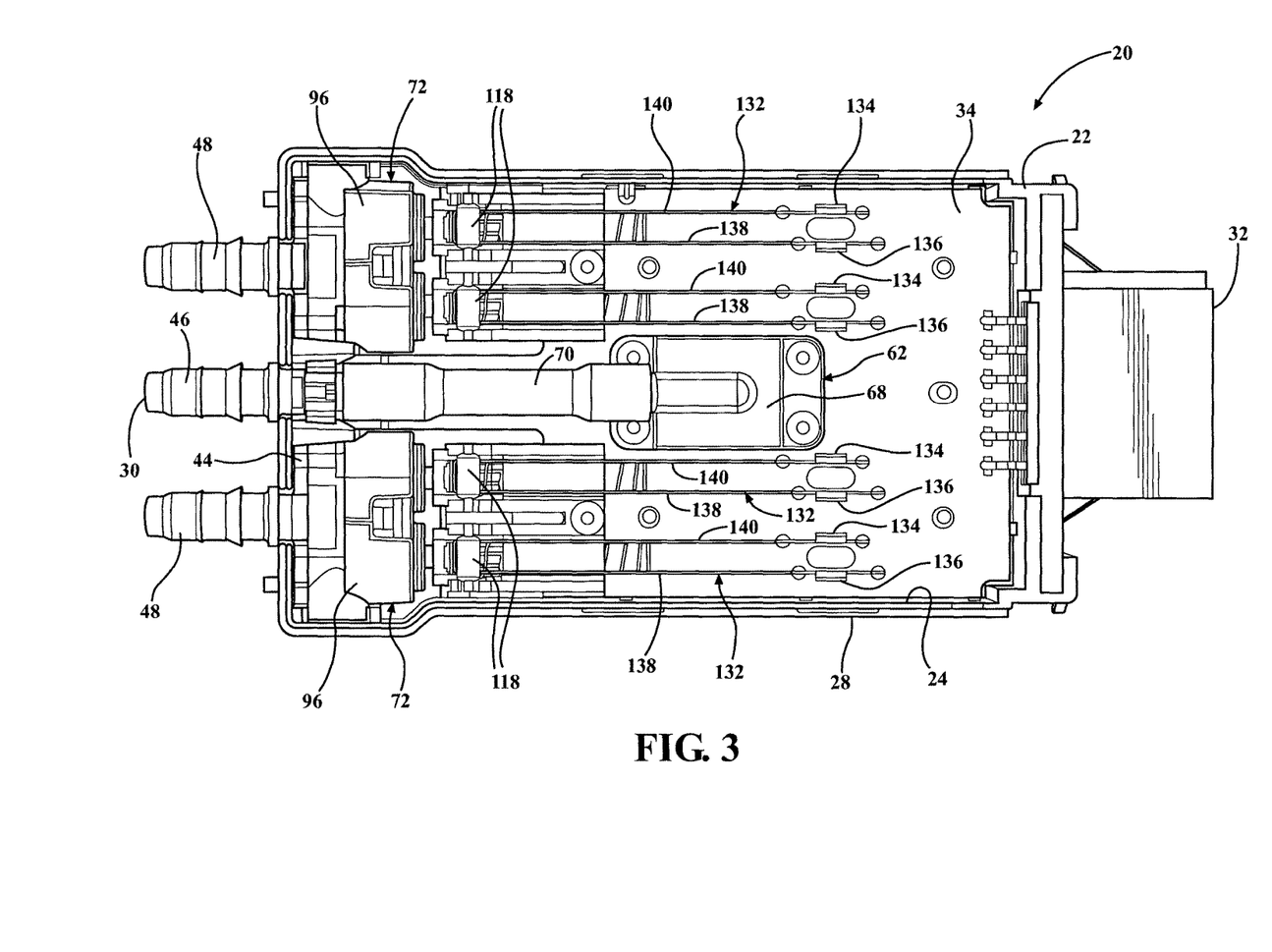
FIG. 3 is a top plan view of the fluid routing device with the first section removed.
Figure 13:
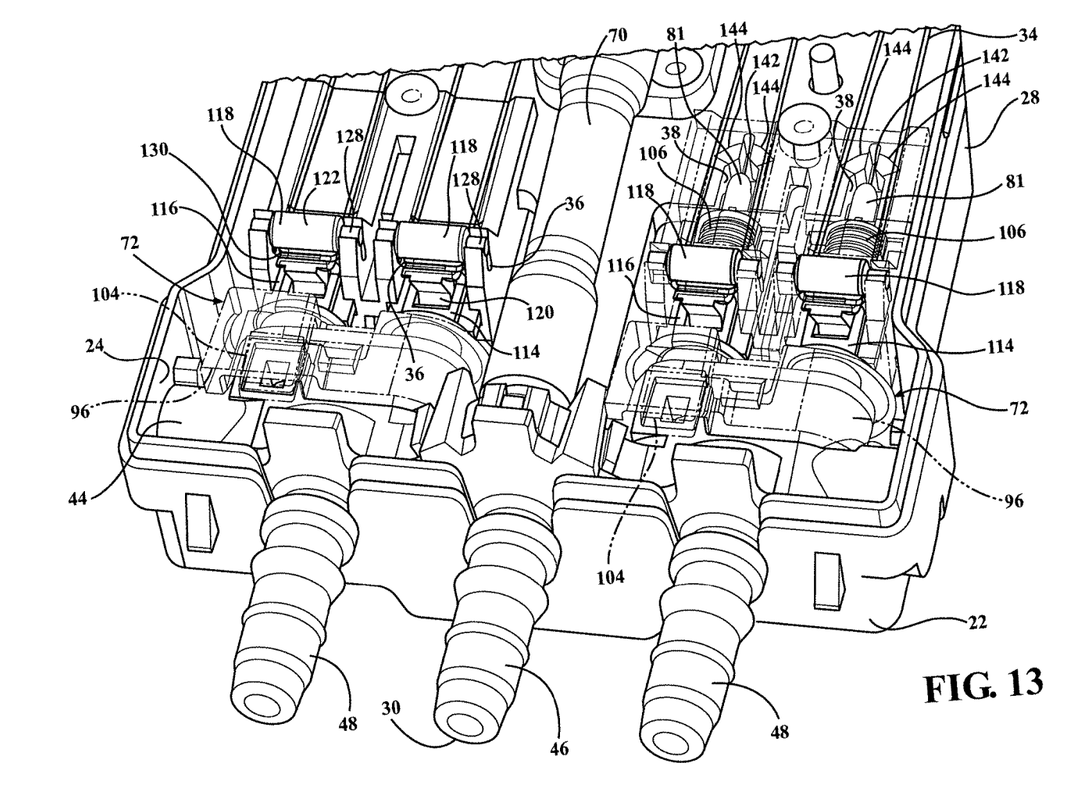
FIG. 13 is a perspective view of the fluid routing device with the first section removed, with the a sleeve of the valve assembly and a portion of the circuit board in phantom.

As shown in FIG. 3, the fluid routing device 20 includes a housing 22 defining an interior 24. As shown in FIGS. 1 and 2, the housing 22 has a first section 26 and a second section 28 coupled to each other with each of the first section 26 and the second section 28 partially defining the interior 24. The housing 22 longitudinally extends to a nozzle end 30 and a connector end 32 opposite one another. As shown in FIG. 3, the housing 22 includes a circuit board 34 disposed within the interior 24 between the first and second section 26, 28. As shown in FIG. 13, the housing 22 defines a pair of cavities 36 spaced from one another. More specifically, the circuit board 34 defines the pair of cavities 36 proximate the first section 26. Furthermore, the circuit board 34 defines a groove 38 extending longitudinally along between the nozzle end 30 and the connector end 32. The cavities 36 and the groove 38 will be better understood as they are explained in greater detail below.

Figure 4:
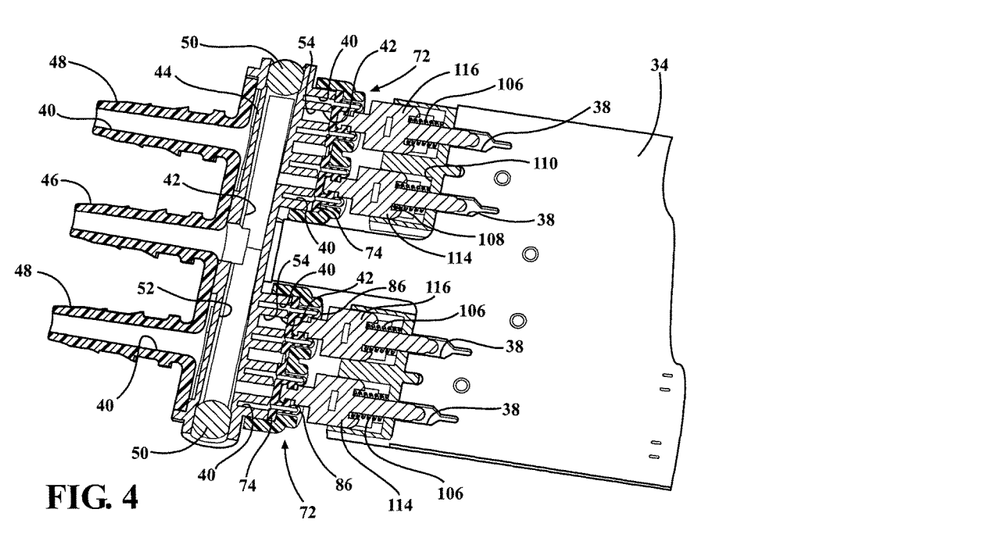
FIG. 4 is a perspective cross-sectional view of a rail, a plurality of nozzles and a circuit board of the housing, and a pair of valve assemblies.

As shown in FIG. 4, the housing 22 further defines a first corridor 40 and a second corridor 42 selectively fluidly coupled to one another. More specifically, the housing 22 includes a rail 44 and a plurality of nozzles 46, 48 with each of the rail 44 and the nozzles 46, 48 partially defining the first and second corridors 40, 42.

The plurality of nozzles 46, 48 are further defined as at least one inlet nozzle 46 and at least one fill nozzle 48 spaced from each other. The nozzles 46, 48 extend outwardly from the first and second section 26, 28 of the housing 22 substantially parallel to one another at the nozzle end 30, as shown in FIGS. 1 and 2. As shown in FIG. 4, the fill nozzle 48 partially defines the first corridor 40. As such, the rail 44 and the fill nozzle 48 are fluidly coupled to one another through the first corridor 40. Similarly, the inlet nozzle 46 partially defines the second corridor 42. As such, the rail 44 and the inlet nozzle 46 are fluidly coupled to one another through the second corridor 42.

The rail 44 extends laterally through the interior 24 of the housing 22 to a pair of rail ends. The rail 44 is adjacent to the nozzles 46, 48 with nozzles 46, 48 disposed transverse to the rail 44 at the nozzle end 30 of the housing as shown in FIG. 3. It is to be appreciated that the rail 44 can be integral with housing 22.

As shown in FIG. 4, the housing 22 includes a pair of balls 50 with one of the balls 50 disposed at each of the rail ends of the rail 44. The balls 50 abut the rail 44 and further define the first and second corridors 40, 42 to prevent fluid from escaping from the rail ends.

The second corridor 42 is further defined as a pair of second corridors 42 spaced from one another. The pair of second corridors 42 is further defined as an inlet corridor 52 and an exhaust corridor 54. More specifically, the inlet corridor 52 is defined by the inlet nozzle 46, the rail 44, and the balls 50 with the inlet corridor 52 extending substantially longitudinal along the rail 44. The exhaust corridor 54 is defined by the rail 44 proximate the fill nozzle 48.

Figure 6:
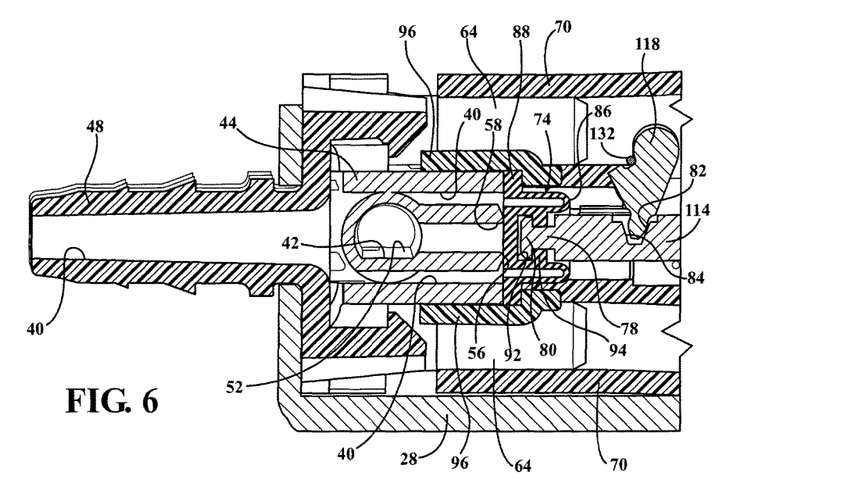
FIG. 6 is a perspective view of the cross-section shown in FIG. 5, with the inlet actuator in a closed position.
Figure 7:
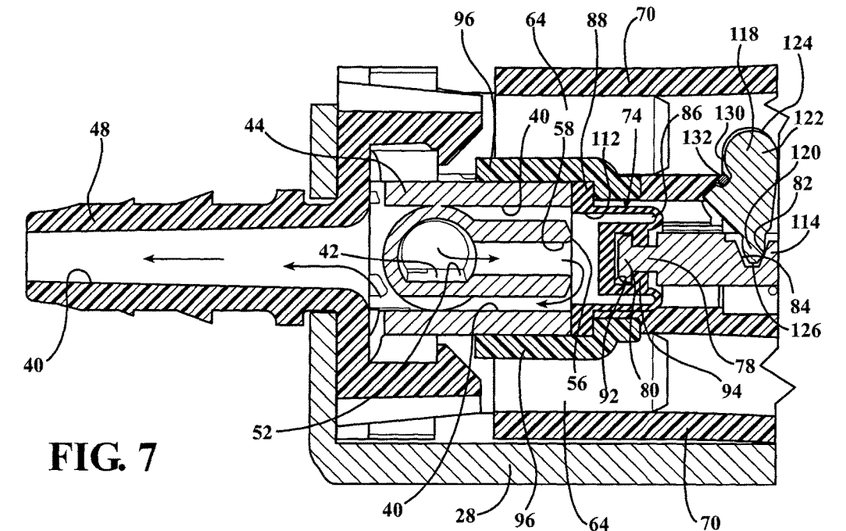
FIG. 7 is a perspective view of the cross-section shown in FIG. 5, with the inlet actuator in an open position.
Figure 8:
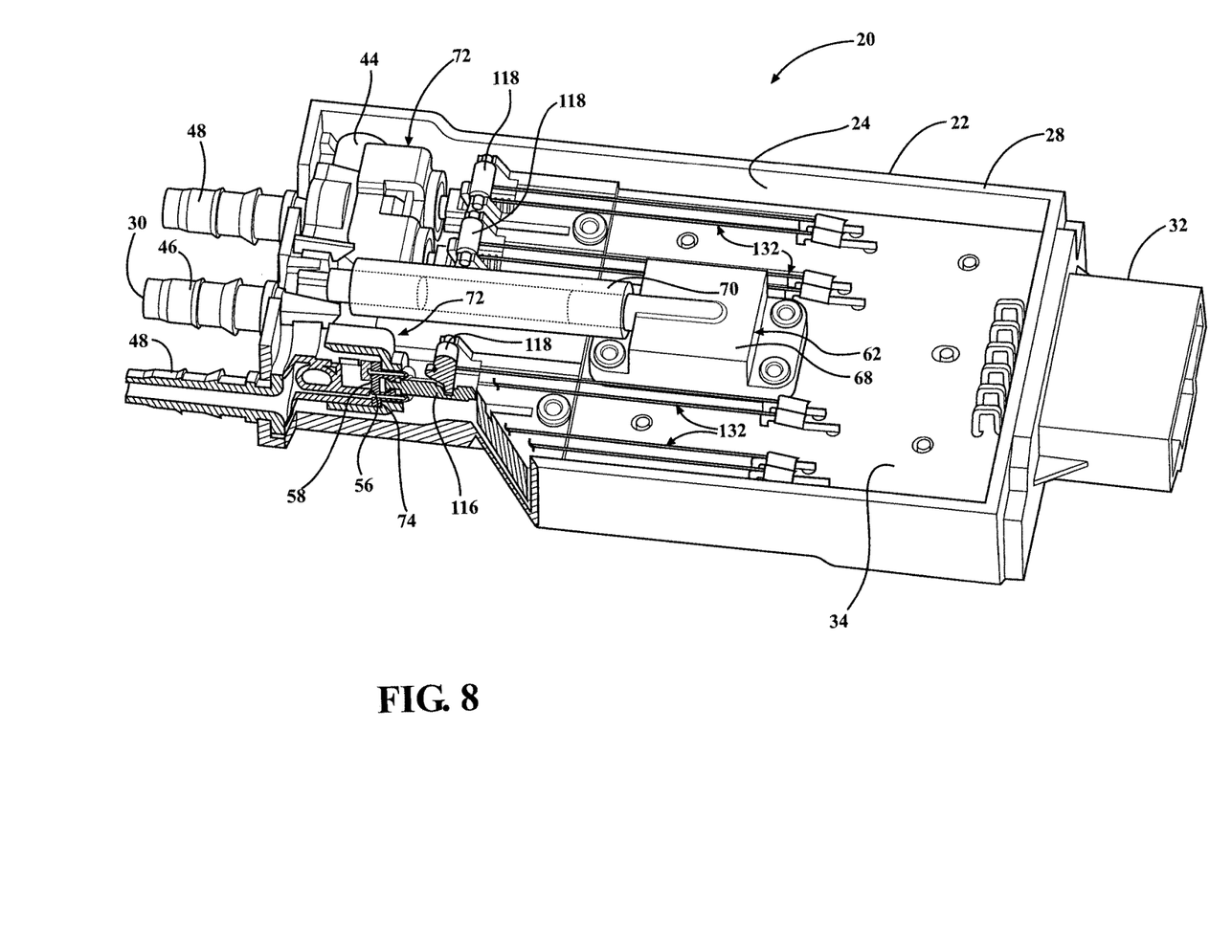
FIG. 8 is a perspective view of the fluid routing device with the first section removed and having a cross-section through an exhaust actuator of the valve assembly.

As discussed above, the rail 44 also partially defines the first corridor 40. As shown in FIGS. 6 and 7, the first corridor 40 substantially surrounds the inlet corridor 52. More specifically, the first corridor 40 substantially surrounds the inlet corridor 52 adjacent the fill nozzle 48.

Figure 5:
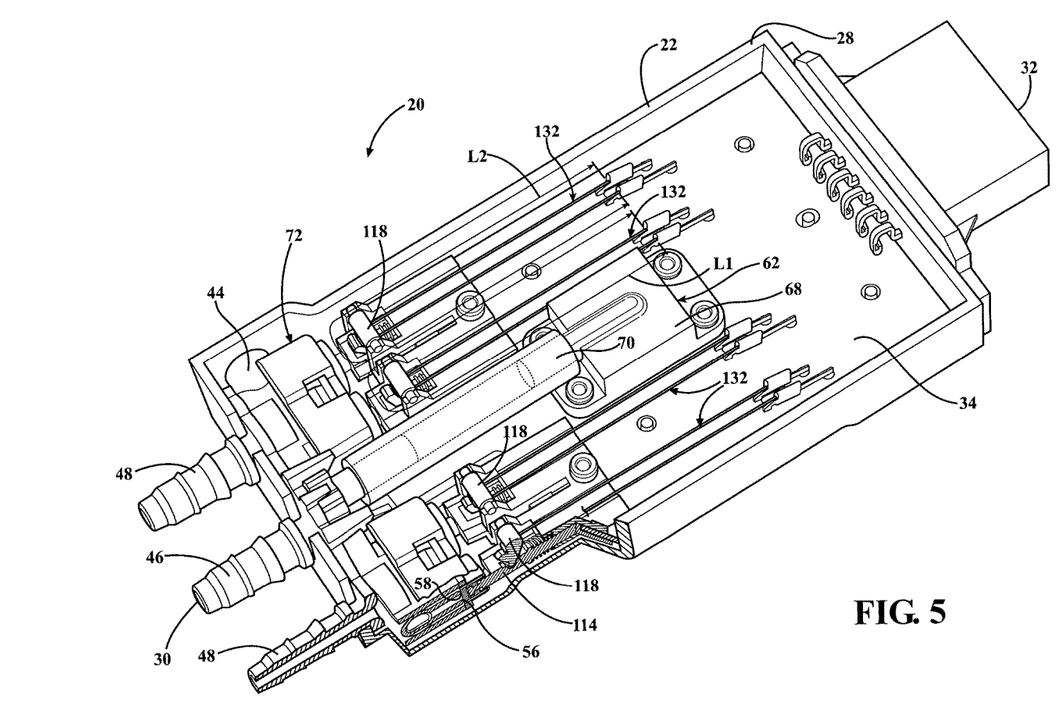
FIG. 5 is a perspective view of the fluid routing device with the first section removed and having a cross-section through an inlet actuator of the valve assembly.
Figure 9:
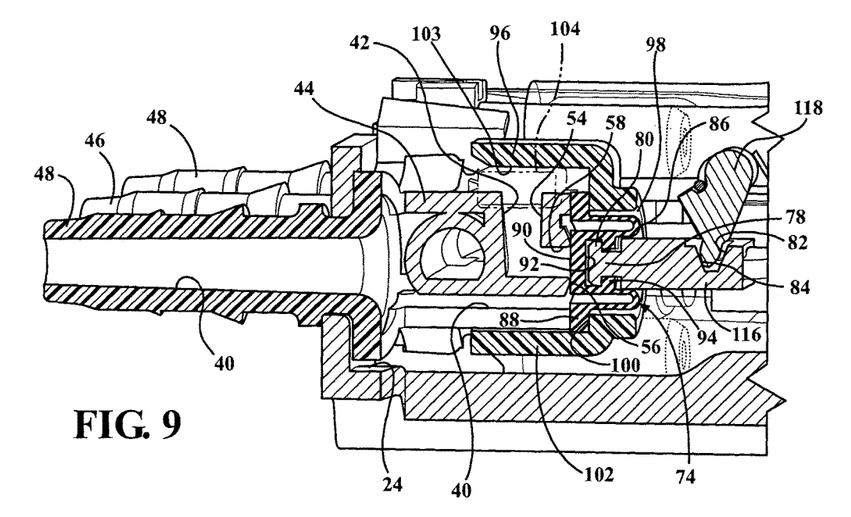
FIG. 9 is a perspective view of the cross-section shown in FIG. 8, with the inlet actuator in a closed position.
Figure 10A:
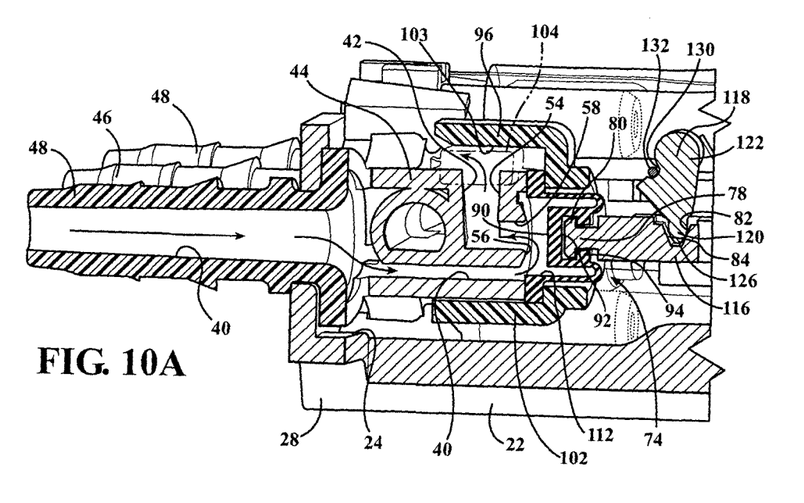
FIG. 10A is a perspective view of the cross-section shown in FIG. 8, with the inlet actuator in an open position.
Figure 10B:
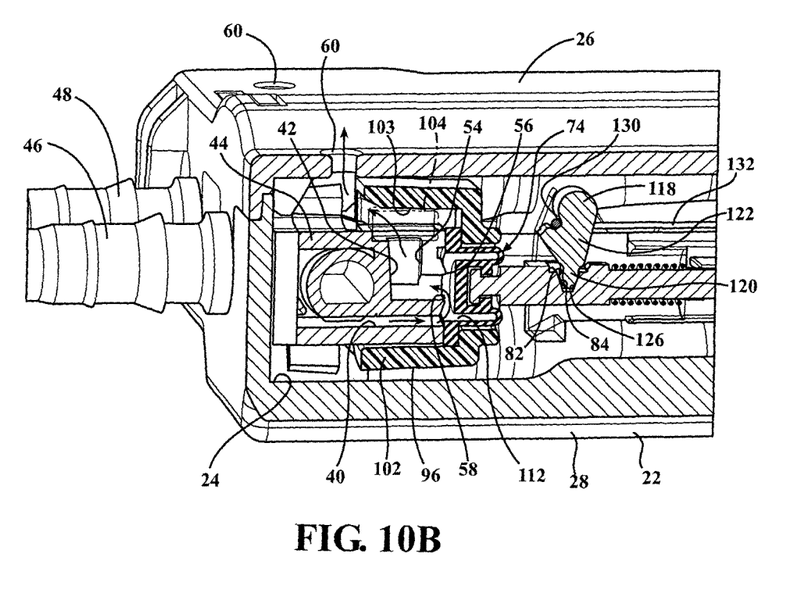
FIG. 10B is a perspective view of the cross-section shown in FIG. 8 including the first section which defines an exhaust outlet, and with the inlet actuator in the open position.

As shown in FIGS. 5-10B, the housing 22 has a seat surface 56 defining an opening 58 between the first and second corridors 40, 42. More specifically, the rail 44 has the seat surface 56 defining the opening 58. The seat surface 56 is further defined as a pair of seat surfaces 56 with the one of the pair of seat surfaces 56 defining the opening 58 between the first corridor 40 and the inlet corridor 52 of the pair of second corridors 42, as shown in FIGS. 5-7, and the other one of the pair of seat surfaces 56 defining the opening 58 between the first corridor 40 and the exhaust corridor 54 of the pair of second corridors 42, as shown in FIGS. 8-10B. The housing 22 further defines an exhaust opening 60 proximate the exhaust corridor 54, as shown in FIG. 10B. The exhaust opening 60 extends through the first section 26 of the housing 22.

Figure 11:
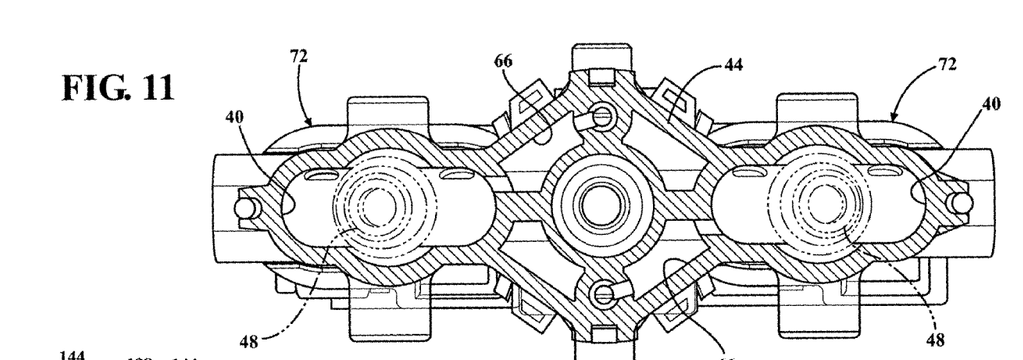
FIG. 11 is a cross-sectional view of the rail defining a first corridor and a pressure sensor corridor fluidly coupled to each other.
Figure 12:
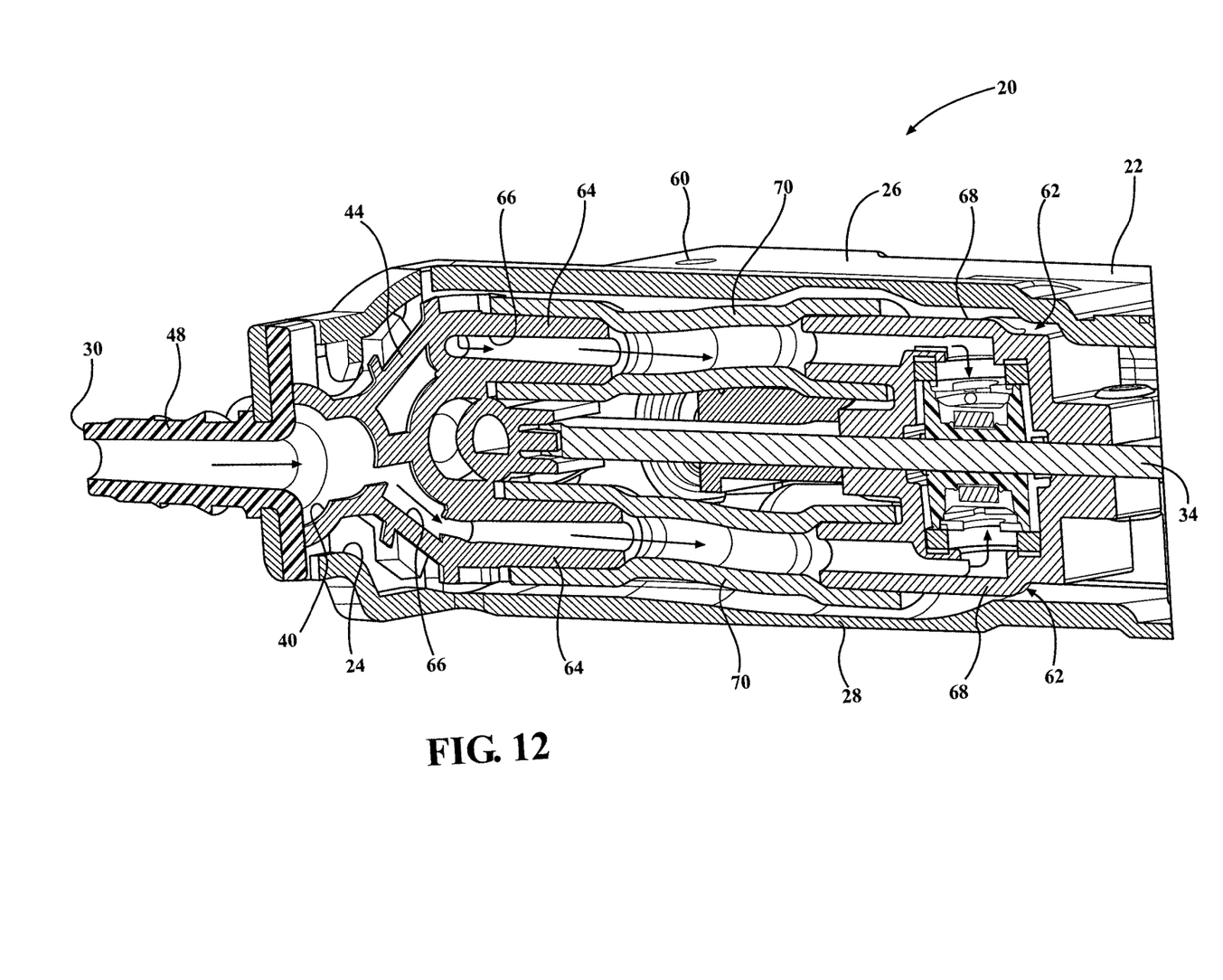
FIG. 12 is perspective cross-sectional view of the fluid routing device including a pressure sensor fluidly coupled to the pressure sensor corridor and the first corridor.

As shown in FIGS. 11 and 12, the fluid routing device 20 further includes a pressure sensor 62 mounted in the housing 22 and fluidly coupled to one of the first and second corridors 40, 42. The rail 44 includes a spigot 64 extending toward the pressure sensor. The rail 44 defines a pressure sensor corridor 66 fluidly coupled to the first corridor 40 and extending through the spigot 64. The pressure sensor 62 includes a pressure sensor element 68 and a tube 70. The tube 70 is coupled to each of the spigot 64 and the pressure sensor element 68. The pressure sensor element 68 is electronically coupled to the circuit board 34 of the housing 22 and is fluidly coupled to the first corridor 40 which is fluidly coupled to the cells at the fill nozzles 48. The fluid coupling of the pressure sensor element 68 to the cells facilitates the pressure sensor element 68 determining the pressure of the fluid within the cells.

As shown in FIG. 4, the fluid routing device 20 further includes a valve assembly 72 disposed in the interior 24. Specifically, the valve assembly 72 is disposed within the interior 24 adjacent the rail 44. As shown in FIGS. 6, 7, and 9-10B, the valve assembly 72 includes a diaphragm 74 and an actuator 114, 116. The actuator 114, 116 is disposed longitudinally within the housing 22 with the actuator 114, 116 extending toward an abutment end proximate the nozzle end 30 of the housing 22 and extending toward a biasing end proximate the connector end 32 of the housing 22. The actuator 114, 116 has a neck 78 and a head 80 each having an annular configuration and axially disposed at the abutment end of the actuator 114, 116. Said differently, the head 80 and the neck 78 are concentric with the neck 78 disposed between the head 80 and the biasing end. The head 80 has a first diameter and the neck 78 has a second diameter with the first diameter greater than the second diameter. The actuator 114, 116 further includes a rod 81 disposed at the biasing end.

The actuator 114, 116 defines a pocket 82 and has an engagement surface 84 disposed within the pocket 82. Specifically, the pocket 82 and the engagement surface 84 are disposed between the abutment end and the biasing end of the actuator 114, 116. The pocket 82 faces the first section 26 of the housing 22. It is to be appreciated that the pocket 82 can face the second section 28 of the housing 22 or can have any other suitable configuration without escaping the scope of the subject invention.

The diaphragm 74 is disposed substantially between the rail 44 and the actuator 114, 116. As shown in FIGS. 6 and 9, the diaphragm 74 has a flexing portion 86 and a flange 88. The flexing portion 86 has an abutment surface 90 and defines a hole 92 facing away from the abutment surface 90. The flexing portion 86 has a ledge 94 radially extending into the hole 92. The flange 88 extends from the flexing portion 86 and is spaced from the abutment surface 90. The flange 88 abuts against the rail 44. The abutment of the flange 88 with rail 44 will be better understood through further explanation below.

The diaphragm 74 interfaces the actuator 114, 116. The head 80 and the portion of the neck 78 of the actuator 114, 116 are at least partially disposed within the hole 92 of the flexing portion 86. Specifically, the head 80 is entirely disposed within the hole 92 and the neck 78 is at least partially disposed within the hole 92. The ledge 94 extends toward the neck 78 such that the head 80 is disposed between the ledge 94 and the abutment surface 90. The ledge 94 selectively engages the head 80 to retain the head 80 within the hole 92 and maintain the interfacing of the diaphragm 74 with the actuator 114, 116.

As shown in FIG. 9, the valve assembly 72 includes a sleeve 96. The sleeve 96 is disposed adjacent to and partially surrounds the rail 44. The sleeve 96 defines an aperture 98 substantially concentric with the opening 58 of the rail 44. The actuator 114, 116 extends through the aperture 98 toward the opening 58 of the rail 44. The sleeve 96 has a flange surface 100 extending radially from the aperture 98 toward the first and second section 26, 28 of the housing 22. The flange surface 100 is configured to substantially follow the configuration of the flange 88 of the diaphragm 74, as will be described in greater detail below. The sleeve 96 has a cover portion 102 extending toward and partially surrounding the rail 44. The cover portion 102 defines a slot 103 adjacent to the exhaust corridor 54 of the pair of second corridors 42. The valve assembly 72 further includes an exhaust silencer 104 disposed within the slot 103 adjacent the exhaust corridor 54 of the pair of second corridors 42. The exhaust silencer 104 restricts the flow of the fluid which reduces sounds which can occur as the fluid passes through the slot 103. Each of the slot 103 and the exhaust silencer 104 are disposed proximate the exhaust opening 60 of the housing 22. The purpose of the slot 103 will be better understood through further explanation below.

The sleeve 96 abuts and seals the diaphragm 74 against the housing 22. Specifically, the sleeve 96 abuts and seals the diaphragm 74 against the rail 44 of the housing 22. The flange 88 of the diaphragm 74 is sandwiched between the rail 44 and the flange surface 100 of the sleeve 96. The diaphragm 74 seals the first and second corridors 40, 42 such that fluid separation between the interior 24 of the housing 22 and the first and second corridors 40, 42 is maintained at the diaphragm 74.

The valve assembly 72 is capable of alternating between an open configuration and a closed configuration. Specifically, the actuator 114, 116 is translatable towards and away from the rail 44. The diaphragm 74 moves with the actuator 114, 116 between an open position when the valve assembly 72 is in the open configuration, as shown in FIGS. 7, 10A, and 10B, and a closed position when the valve assembly 72 is in the closed configuration, as shown in FIGS. 6 and 9. The interfacing of the diaphragm 74 with the actuator 114, 116 facilitates movement of the flexing portion 86 of the diaphragm 74 with the actuator 114, 116. Specifically, the flange 88 of the diaphragm 74 sandwiched between the sleeve 96 and the rail 44 remains stationary as the flexing portion 86 moves with actuator 114, 116 between the open and closed positions. The diaphragm 74 abuts and seals the seat surface 56 and covers the opening 58 in the closed position, as shown in FIGS. 6 and 9. Specifically, the abutment surface 90 of the flexing portion 86 of the diaphragm 74 abuts and seals the seat surface 56 and covers the opening 58 in the closed position. The diaphragm 74 is spaced from the seat surface 56 in the open position as shown in FIGS. 7, 10A, and 10B. Specifically, the abutment surface 90 of the flexing portion 86 of the diaphragm 74 is spaced from the seat surface 56 in the open position.

As shown in FIG. 4, the valve assembly 72 includes a bias member 106 abutting each of the housing 22 and the actuator 114, 116 with the bias member 106 biasing the actuator 114, 116 toward the closed position. Specifically, the actuator 114, 116 defines a bias surface 108 and the housing 22 defines a shoulder 110 facing the bias surface 108. More specifically, the circuit board 34 of the housing 22 defines the shoulder 110. The bias member 106 is typically configured as a compression spring, with the bias member 106 surrounding the rod 81 of the actuator 114, 116 and abutting each of the bias surface 108 and the shoulder 110. The bias member 106 biases the actuator 114, 116 away from the shoulder 110 of the housing 22 toward the closed position. It is to be appreciated that bias member 106 can be any suitable configuration for biasing the actuator 114, 116 toward the closed position.

As shown in FIGS. 7, 10A, and 10B, the valve assembly 72 fluidly couples the first and second corridors 40, 42 to one another when the valve assembly 72 is in the open configuration. Specifically, the diaphragm 74 is spaced from the seat surface 56 in the open position to fluidly couple the first and second corridors 40, 42 through the opening 58. The diaphragm 74 at least partially defines an intermediate corridor 112 between the first and second corridors 40, 42 when the valve assembly 72 is in the open configuration with the intermediate corridor 112 fluidly coupling the first and second corridors 40, 42. The sealing of the diaphragm 74 against the housing 22 by the sleeve 96 further defines the intermediate corridor 112 and fluidly couples the first, second, and intermediate corridor 40, 42, 112. Specifically, the flange 88 of the diaphragm 74 between the rail 44 and the sleeve 96 remains stationary while the flexing portion 86 of the diaphragm 74 moves away from the opening 58 as the diaphragm 74 moves with the actuator 114, 116 from the closed position to the open position. The diaphragm 74 in the open position defines the intermediate corridor 112.

As shown in FIGS. 5, 6, 8 and 9, the valve assembly 72 fluidly separates the first and second corridors 40, 42 from one another when the valve assembly 72 is in the closed configuration. Specifically, the diaphragm 74 abuts and seals the seat surface 56 and covers the opening 58 in the closed position to fluidly separate the first and second corridors 40, 42. In the closed configuration, with the diaphragm 74 and the actuator 114, 116 in the closed position, the abutment surface 90 of the flexing portion 86 of the diaphragm 74 abuts against and seals the seat surface 56 of the rail 44. The sealing of the seat surface 56 by the abutment surface 90 closes the opening 58 of the rail 44 which separates the fluid in the first corridor 40 from the fluid in the second corridor 42.

Figure 14:
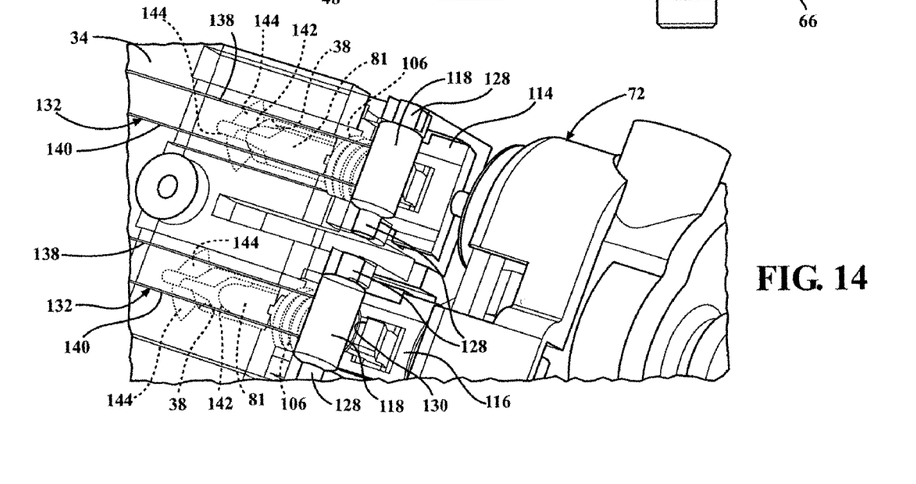
FIG. 14 is a perspective view of the valve assembly and the housing with a first contact of the actuators of the valve assembly and a second contact of the housing each shown in phantom.

As set forth above, the second corridor 42 is further defined as the pair of second corridors 42 spaced from one another with one of the pair of second corridors 42 further defined as the inlet corridor 52 and the other one of the pair of second corridors 42 further defined as the exhaust corridor 54. Similarly, the actuator 114, 116 is further defined as a pair of actuators 114, 116, as shown in FIG. 14. The pair of actuators 114, 116 are spaced from each other with one of the actuators 114, 116 selectively fluidly coupling the first corridor 40 with one of the second corridors 42 and with another one of the actuators 114, 116 selectively fluidly coupling the first corridor 40 with the other one of the second corridors 42. Specifically, the pair of actuators 114, 116 are further defined as an inlet actuator 114 and an exhaust actuator 116. As shown in FIG. 4, the inlet actuator 114 selectively fluidly couples the first corridor 40 with the inlet corridor 52 of the pair of second corridors 42. The exhaust actuator 116 selectively fluidly couples the first corridor 40 with the exhaust corridor 54 of the pair of second corridors 42.

As shown in FIG. 4, the diaphragm 74 extends between the inlet and exhaust actuators 114, 116. The flexing portion 86 of the diaphragm 74 is further defined as a pair of flexing portions 86 with one of the flexing portions 86 adjacent to and moving with the inlet actuator 114 between the open and closed positions and the other one of the flexing portions 86 adjacent to and moving with the exhaust actuator 116 between the open and closed positions. It is to be appreciated that the diaphragm 74 can be a pair of diaphragms 74 each having one of the pair of flexing portions 86. Furthermore, the diaphragm 74 can be any suitable configuration without escaping the scope of the subject invention. The bias member 106 is further defined as a pair of bias members 106 with one of the bias members 106 biasing the inlet actuator 114 toward the closed position and the other one of the bias members 106 biasing the exhaust actuator 116 toward the closed position.

As shown in FIGS. 7, 10A, and 10B, the fluid routing device 20 further includes a link 118 disposed within the interior 24 and pivotably mounted to the housing 22. The link 118 includes an engagement portion 120 engaging the valve assembly 72 and a pivot portion 122 spaced from the engagement portion 120 with the link 118 pivotably mounted to the housing 22 at the pivot portion 122. Specifically, the link 118 includes a pivot end 124 and an engagement end 126 with the pivot portion 122 defined at the pivot end 124 and the engagement portion 120 defined at the engagement end 126. The pivot end 124 of the link 118 is disposed adjacent the first section 26 of the housing 22 and the engagement end 126 of the link 118 is disposed adjacent the actuator 114, 116.

As shown in FIG. 13, the pivot portion 122 includes a pair of posts 128 extending away from one another. As set forth above, the circuit board 34 of the housing 22 defines the pair of cavities 36 spaced from one another. The posts 128 are disposed within the cavities 36. The link 118 is pivotable about the posts 128 relative to the housing 22. The posts 128 are integral with the pivot portion 122 of the link 118; however, it is to be appreciated that the posts 128 can rotate relative to the pivot portion 122 of the link 118.

The link 118 is pivotable between a first position, as shown in FIGS. 5, 6, 8, and 9, and a second position, as shown in FIGS. 7, 10A, and 10B, with the engagement end 126 of the link 118 disposed closer to the rail 44 in the first position than in the second position. As set forth above, the actuator 114, 116 defines the pocket 82 and has the engagement surface 84 disposed within the pocket 82. As shown in FIGS. 7, 10A, and 10B, the link 118 is at least partially disposed within the pocket 82 and engages the engagement surface 84 to facilitate moving the actuator 114, 116 and the diaphragm 74 between the open and closed positions. Specifically, the engagement portion 120 of the link 118 is at least partially disposed within the pocket 82 and engages the engagement surface 84 of the actuator 114, 116. With the link 118 in the first position, the actuator 114, 116 and the diaphragm 74 are in the closed position. With the link 118 in the second position, the actuator 114, 116 and the diaphragm 74 are in the open position.

As shown in FIG. 13, the link 118 defines a channel 130 between the pivot end 124 and the engagement end 126. The channel 130 extends transversely across the link 118 and substantially faces the nozzle end 30 of the housing 22.

As shown in FIG. 3, the fluid routing device 20 further includes a shape memory alloy member 132. The shape memory alloy member 132 is typically comprised of an alloy of nickel and titanium which contracts when heat is applied. An example of such an alloy is Flexinol® produced by Dynalloy, Inc. of Tustin, Calif., USA. It is to be appreciated that any alloy configured to contract when heated can be utilized for the shape memory alloy member 132.

The shape memory alloy member 132 mounted to the housing 22 within the interior 24 and extends toward the valve assembly 72. More specifically, the shape memory alloy member 132 is mounted to the circuit board 34 of the housing 22 proximate the connector end 32. The shape memory alloy member 132 has a first end 134 and a second end 136 spaced from one another. The shape memory alloy member 132 is mounted to the circuit board 34 at each of the first and second ends 134, 136 proximate the connector end 32 of the housing 22. Furthermore, the shape memory alloy member 132 is electrically coupled to the circuit board 34 at the first and second ends 134, 136.

The shape memory alloy member 132 is coupled to the link 118 between the first and second ends 134, 136. Specifically, the shape memory alloy member 132 defines a first portion 138 between the first end 134 and the link 118 and a second portion 140 between the second end 136 and the link 118, with the first and second portions 138, 140 substantially parallel to one another. Said differently, the shape memory alloy member 132 has a substantially "U" configuration, as shown in FIG. 14. Furthermore, the shape memory alloy member 132 is further defined as a single strand. It is to be appreciated that the shape memory alloy member 132 can be any configuration capable of contracting when heated without escaping the scope of the subject invention.

The shape memory alloy member 132 is coupled to the link 118 between the engagement portion 120 and the pivot portion 122. Specifically, the shape memory alloy member 132 is disposed within the channel 130 of the link 118 to maintain the coupling of the shape memory alloy member 132 with the link 118. Said differently, the shape memory alloy member 132 is retained within the channel 130 of the link 118.

The shape memory alloy member 132 alternates between a first length L1 in a de-energized state and a second length L2 in an energized state, each operatively illustrated in FIG. 5. Each of the first and second lengths L1, L2 is measured between the first and second ends 134, 136 of the shape memory alloy member 132. As discussed above, the shape memory alloy member 132 contracts when heated. The circuit board 34 delivers an electrical current through the shape memory alloy member 132 in the energized state, which heats and contracts the shape memory alloy member 132. As a result, the second length L2 of the shape memory alloy member 132 in the energized state is less than the first length L1 of the shape memory alloy member 132 in the de-energized state.

The link 118 is coupled between the valve assembly 72 and the shape memory alloy member 132. Specifically, the link 118 pivots relative to the housing 22 between the first position when the shape memory alloy member 132 is in the de-energized state and the first length L1, as shown in FIGS. 6 and 9, and the second position when the shape memory alloy member 132 is in the energized state and the second length L2, as shown in FIGS. 7, 10A, and 10B. The link 118 is configured to alternate the valve assembly 72 between the closed configuration when the link 118 is in the first position and the open configuration when the link 118 is in the second position for selectively fluidly coupling the first and second corridors 40, 42 to one another.

As described above, the actuator 114, 116 is further defined as the pair of actuators 114, 116 which are further defined as the inlet actuator 114 and the exhaust actuator 116. Similarly, the link 118 is further defined as a pair of links 118 and the shape memory alloy member 132 is further defined as a pair of shape memory alloy members 132. One of the shape memory alloy members 132 is coupled to the links 118 and the other one of the shape memory alloy members 132 is coupled to the other one of the links 118. Furthermore, the one of the links 118 is coupled to the inlet actuator 114 and the other one of the links 118 is coupled to the exhaust actuator 116. It is to be appreciated that the inlet actuator 114 and the corresponding link 118 and the shape memory alloy 132 interact to move the inlet actuator 114 between the open and closed positions. Likewise, exhaust actuator 116 and the corresponding link 118 and the shape memory alloy 132 interact to move the exhaust actuator 116 between the open and closed positions. The inlet and exhaust actuators 114, 116 independently move between the open and closed positions. When either of the inlet and exhaust actuators 114, 116 are in the open position, the valve assembly 72 is in the open configuration. When either of the inlet and exhaust actuators 114, 116 are in the closed position, the valve assembly 72 is in the closed configuration. Since the valve assembly 72 includes both the inlet and exhaust actuators 114, 116 independently moving between the first and second positions, it is possible that the valve assembly 72 can simultaneously be in both of the open and closed configurations. Specifically, the valve assembly 72 is in the open configuration with respect to the one of the inlet and exhaust actuators 114, 116 which is in the open position and the valve assembly 72 is in the closed configuration with respect to the other one of the inlet and exhaust actuators 114, 116 which is in the closed position.

As shown in FIGS. 13 and 14, the actuator includes a first contact 142 and the housing 22 includes a second contact 144. More specifically, first contact 142 is disposed on the rod 81 of each actuator 114, 116. The second contact 144 is further defined as a pair of second contacts 144 disposed within the groove 38 and spaced from each other. The shape memory alloy member 132 further includes an over-energized state. As, generally shown in FIG. 12, the shape memory alloy member 132 has a third length that is less than the second length L2 of the shape memory alloy member 132 in the energized state. In the over-energized state, the shape memory alloy member 132 is heated to a critical temperature just less than an over-heating temperature. The over-heating temperature is defined as a temperature at which the shape memory alloy member 132 will overheat.

The first contact 142 engages the second contact 144 in the over-energized state to facilitate alternation of the shape memory alloy member to the de-energized state to prevent over-heating of the shape memory alloy member 132. More specifically, in the over-energized state the shape memory alloy member 132 contracts to the third length causing the first contact 142 of the actuator 114, 116 to engage each of the pair of second contacts 144 of the circuit board 34. The engagement of first contact 142 with each of the pair of second contacts 144 facilitates an electrical short circuit within the circuit board 34. More specifically, the electrical short circuit produces a signal to the circuit board 34. Upon receiving the signal, the circuit board 34 stops the electrical current within the shape memory alloy member 132, bringing the shape memory alloy member 132 to the de-energized state to prevent over-heating. In the de-energized state, the temperature of the shape memory alloy member 132 reduces from the critical temperature and the shape memory alloy member 132 expands to the first length L1. The bias member 106 moves the actuator 114, 116 and the first contact 142 away from the second contacts 144. The disconnection of the first and second contacts 142, 144 disconnects the electrical short circuit in the circuit board 34, which allows shape memory alloy member 132 to alternate into the energized state.

The operation of the fluid routing device 20 will be discussed below for illustrative purposes only. Specifically, the operation of the fluid routing device 20 transporting fluid to the cell for inflating the cell will be discussed first below, followed by the operation of the fluid routing device 20 transporting fluid from the cell for deflating the cell. When neither inflation nor deflation of the cell is desired, the bias members 106 bias each of the inlet and exhaust actuators 114, 116 to the closed position with the diaphragm 74 abutting and sealing each of the pair of seat surfaces 56, as shown in FIGS. 6 and 9. Furthermore, each of the shape memory alloy members 132 are in the de-energized state.

To inflate the cell, the circuit board 34 delivers the electrical current to the one of the shape memory alloy members 132 corresponding to the inflate actuator which alternates the shape memory alloy member 132 from the de-energized state to the energized state. The shape memory alloy member 132 contracts from the first length L1 to the second length L2, with each length L1, L2 operatively shown in FIG. 5. The shape memory alloy member 132 pivots the one of the links 118 corresponding to the inflate actuator from the first position, as shown in FIG. 6, to the second position, as shown in FIG. 7. The pivoting of the link 118 from the first position to the second position facilitates movement of the inflate actuator from the closed position, in which the abutment surface 90 of the flexing portion 86 of the diaphragm 74 seals the seat surfaces 56, to the open position, in which the abutment surface 90 is spaced from the seat surface 56 and the opening 58 is uncovered.

With the opening 58 uncovered, the fluid passes through the inflate corridor of the pair of second corridors 42 defined by the inlet nozzle 46 and the rail 44. The fluid passes through the opening 58 and into the intermediate corridor 112 defined by the diaphragm 74. The fluid passes through the first corridor 40 defined by rail 44 and the fill nozzle 48 into the cell.

To stop the inflation of the cell, the circuit board 34 ends the delivery of the electrical current to the one of the shape memory alloy members 132 corresponding to the inflate actuator which alternates the shape memory alloy member 132 from the energized state to the de-energized state. The bias member 106 biases the inflate actuator and the diaphragm 74 from the open position, as shown in FIG. 7, to the closed position, as shown in FIG. 6, and the shape memory alloy member 132 expands from the second length L2 to the first length L1, with each length L1, L2 operatively shown in FIG. 5. In the closed position, the abutment surface 90 of the flexing portion 86 of the diaphragm 74 seals the seat surface 56, fluidly separating the first corridor 40 from the inflate corridor.

To deflate the cell, the circuit board 34 delivers the electrical current to the one of the shape memory alloy members 132 corresponding to the exhaust actuator 116 which alternates the shape memory alloy member 132 from the de-energized state to the energized state. The shape memory alloy member 132 contracts from the first length L1 to the second length L2, with each length L1, L2 operatively shown in FIG. 5. The shape memory alloy member 132 pivots the one of the links 118 corresponding to the exhaust actuator 116 from the first position, as shown in FIG. 9, to the second position, as shown in FIGS. 10A and 10B. The pivoting of the link 118 from the first position to the second position facilitates movement of the exhaust actuator 116 from the closed position, in which the abutment surface 90 of the flexing portion 86 of the diaphragm 74 seals the seat surfaces 56, to the open position, in which the abutment surface 90 is spaced from the seat surface 56 and the opening 58 is uncovered.

With the opening 58 uncovered, the fluid passes through the first corridor 40 defined by the fill nozzle 48 and the rail 44. The fluid passes through the intermediate corridor 112 defined by the diaphragm 74 and through the opening 58. The fluid passes through the exhaust corridor 54 of the pair of second corridors 42 defined by the rail 44. The fluid passes through the exhaust silencer 104 and the slot 103 of the sleeve 96. As shown in FIG. 10B, with the exhaust opening 60 proximate the slot 103 of the sleeve 96, a majority of the fluid passes out of the housing 22 through the opening 58. A minority of the fluid is dispersed within the interior 24 of the housing 22.

To stop the deflation of the cell, the circuit board 34 ends the delivery of the electrical current to the one of the shape memory alloy members 132 corresponding to the exhaust actuator 116 which alternates the shape memory alloy member 132 from the energized state to the de-energized state. The bias member 106 biases the exhaust actuator 116 and the diaphragm 74 from the open position, as shown in FIGS. 10A and 10B, to the closed position, as shown in FIG. 9, and the shape memory alloy member 132 expands from the second length L2 to the first length L1, with each length L1, L2 operatively shown in FIG. 5. In the closed position, the abutment surface 90 of the flexing portion 86 of the diaphragm 74 seals the seat surface 56, fluidly separating the first corridor 40 from the exhaust corridor 54.

It is to be appreciated that the pressure sensor 62 is continually fluidly coupled to the cell. Furthermore, the pressure sensor element 68 is electronically coupled to the circuit board 34 and is capable of sending a signal to circuit board 34 based on the pressure of the fluid within the cell. Furthermore, the circuit board 34 can have a plurality of parameters relating to the pressure within cell as set forth in the signal from the circuit board 34. It is to be appreciated that the circuit board 34 can begin or end inflation or deflation of the cell when one of the parameters are trigger by the signal from the circuit board 34.

As described above, the fluid routing device 20 operatively has one inlet nozzle 46 and one fill nozzle 48, with each fluidly coupled to the valve assembly 72 having the inlet actuator 114 and the exhaust actuator 116. However, as shown in the exemplary embodiment set forth in FIG. 3, the fluid routing device 20 has a pair of fill nozzles 48 with each nozzle 48 capable of being coupled to at least one cell. Furthermore, the fluid routing device 20 has at least two valve assemblies 72 with each valve assembly 72 fluidly coupled to the inlet nozzle 46 while each of the valve assemblies 72 is independently fluidly coupled to one of the fill nozzles 48, as shown in FIG. 4. More specifically, the inlet corridor 52 of the second corridor 42 extends to each of the valve assemblies 72 such that the valve assemblies 72 share fluid from the inlet nozzle 46. Furthermore, housing 22 defines a pair of exhaust openings 60 each independently disposed proximate one of the valve assemblies 72. The exhaust corridor 54 of the pair of second corridors 42 is further defined as two exhaust corridors 54 spaced from each other and independently disposed proximate one of the valve assemblies 72. Likewise, the first corridor 40 is further defined as a pair of first corridors 40 with each first corridor 40 independently fluidly coupled to one of the fill nozzles 48 and independently fluidly coupled to one of the valve assemblies 72. As shown in FIG. 3, the pair of shape memory alloy members 132 are further defined as two pairs of the shape memory alloy members 132 with each valve assembly 72 independently coupled to one of the two pairs of shape memory alloy members 132, as operatively described above. Likewise, the pair of links 118 are further defined as two pairs of the links 118 with each valve assembly 72 independently coupled to one of the two pairs of links 118, as operatively described above. As shown in FIGS. 11 and 12, the spigot 64 is further defined as a pair of spigots 64 each independently fluidly coupled to one of the pair of first corridors 40. The pressure sensor 62 is further defined as a pair of pressure sensors 62 each independently fluidly coupled to one of the pair of spigots 64. It is to be appreciated that the fluid routing device 20 can have any number of nozzles 46, 48, valve assemblies 72, exhaust openings 60, first and second corridors 40, 42, shape memory alloy members 132, links 118, etc., without escaping the scope of the subject invention.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid routing device for directing the transportation of a fluid, said fluid routing device comprising:
   a housing defining an interior and further defining a first corridor and a second corridor selectively fluidly coupled to one another;
   a valve assembly disposed in said interior and capable of alternating between an open configuration and a closed configuration with said valve assembly fluidly coupling said first and second corridors to one another when in said open configuration and said valve assembly fluidly separating said first and second corridors from one another when in said closed configuration;
   a shape memory alloy member mounted to said housing within said interior and extending toward said valve assembly, said shape memory alloy member alternating between a first length in a de-energized state and a second length in an energized state; and
   a link disposed within said interior and pivotably mounted to said housing with said link coupled between said valve assembly and said shape memory alloy member, said link pivoting relative to said housing between a first position when said shape memory alloy member is in said de-energized state and said first length and a second position when said shape memory alloy member is in said energized state and said second length, said link configured to alternate said valve assembly between said closed configuration when said link is in said first position and said open configuration when said link is in said second position for selectively fluidly coupling said first and second corridors to one another;
   wherein said valve assembly includes a diaphragm to fluidly separate said interior of said housing and said first and second corridors;
   wherein said valve assembly includes an actuator movable between an open position when said valve assembly is in said open configuration and a closed position when said valve assembly is in said closed configuration; and
   wherein said valve assembly includes a bias member abutting each of said housing and said actuator with said bias member biasing said actuator into said closed position.

2. A fluid routing device as set forth in claim 1 wherein said second corridor is further defined as a pair of second corridors spaced from one another and wherein said actuator is further defined as a pair of actuators with one of said actuators selectively fluidly coupling said first corridor with one of said second corridors and with another one of said actuators selectively fluidly coupling said first corridor with another one of said second corridors.

3. A fluid routing device as set forth in claim 1 wherein said shape memory alloy member has a first end and a second end spaced from one another with said shape memory alloy member coupled to said link between said first and second ends.

4. A fluid routing device as set forth in claim 3 wherein said shape memory alloy member defines a first portion between said first end and said link and a second portion between said second end and said link, with said first and second portions substantially parallel to one another.

5. A fluid routing device as set forth in claim 1 wherein said actuator includes a first contact and said housing includes a second contact, wherein said shape memory alloy member further includes an over-energized state with said first contact engaging said second contact in said over-energized state to facilitate alternation of said shape memory alloy member to said de-energized state to prevent overheating of said shape memory alloy member.

6. A fluid routing device as set forth in claim 1 further including a pressure sensor mounted in said housing and fluidly coupled to one of said first and second corridors.

7. A fluid routing device as set forth in claim 1 wherein said link includes an engagement portion engaging said valve assembly and a pivot portion spaced from said engagement portion with said link pivotably mounted to said housing at said pivot portion.

8. A fluid routing device as set forth in claim 7 wherein said link includes a pivot end and an engagement end with said pivot portion defined at said pivot end and said engagement portion defined at said engagement end.

9. A fluid routing device as set forth in claim 7 wherein said shape memory alloy member is coupled to said link between said engagement portion and said pivot portion.

10. A fluid routing device as set forth in claim 7 wherein said pivot portion includes a pair of posts extending away from one another and said housing defines a pair of cavities spaced from one another with said posts disposed within said cavities and said link pivotable about said posts relative to said housing.

11. A fluid routing device as set forth in claim 1 wherein said link defines a channel with said shape memory alloy member disposed within said channel to maintain said coupling of said shape memory alloy member with said link.

12. A fluid routing device as set forth in claim 1 wherein said diaphragm interfaces said actuator and moves with said actuator between said open position when said valve assembly is in said open configuration and said closed position when said valve assembly is in said closed configuration.

13. A fluid routing device as set forth in claim 12 wherein said actuator defines a pocket and has an engagement surface disposed within said pocket, with said link at least partially disposed within said pocket and engaging said engagement surface to facilitate moving said actuator and said diaphragm between said open and closed position.

14. A fluid routing device as set forth in claim 12 wherein said housing has a seat surface defining an opening between said first and second corridors with said diaphragm abutting and sealing said seat surface and covering said opening in said closed position to fluidly separate said first and second corridors and said diaphragm spaced from said seat surface in said open position to fluidly couple said first and second corridors through said opening.

15. A fluid routing device as set forth in claim 14 wherein said housing includes a rail having said seat surface defining said opening with said diaphragm abutting and sealing said seat surface and covering said opening in said closed position to fluidly separate said first and second corridors.

16. A fluid routing device as set forth in claim 12 wherein said diaphragm at least partially defines an intermediate corridor between said first and second corridors when said valve assembly is in said open configuration with said intermediate corridor fluidly coupling said first and second corridors.

17. A fluid routing device as set forth in claim 16 wherein said valve assembly includes a sleeve abutting and sealing said diaphragm against said housing with said sealing of said diaphragm against said housing further defining said intermediate corridor and fluidly coupling said first, second, and intermediate corridors.

* * * * *